March 15, 1949. H. N. DIMICK 2,464,492
SELF-ALIGNING BEARING
Filed May 10, 1944
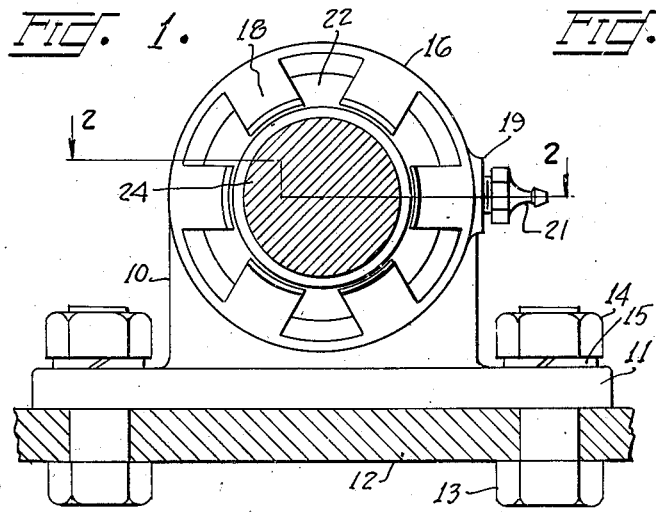
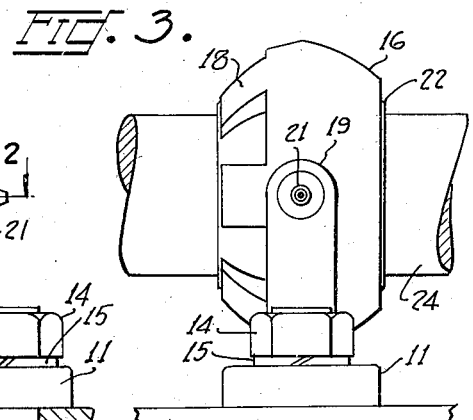
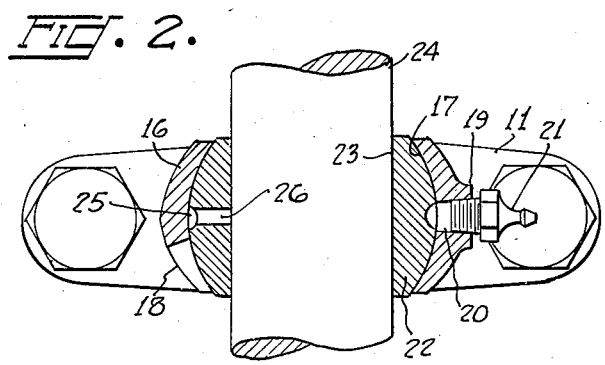
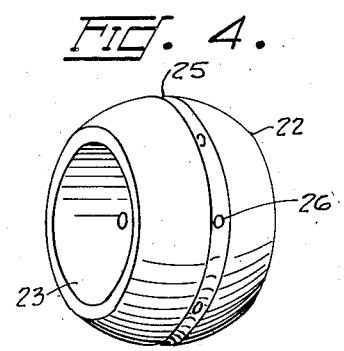
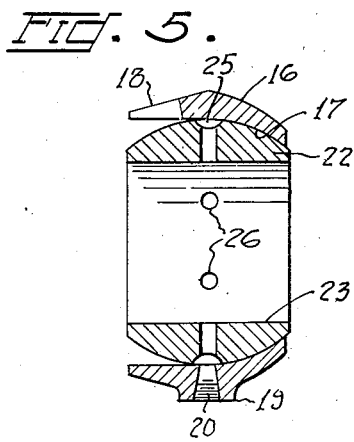
INVENTOR
HENRY NOEL DIMICK
BY
ATTORNEY Patented Mar. 15, 1949

2,464,492

UNITED STATES PATENT OFFICE 2,464,492

SELF-ALIGNING BEARING

Henry N. Dimick, Portland, Oreg., assignor to Willamette Hyster Company, Portland, Oreg., a corporation of Oregon Application May 10, 1944, Serial No. 534,950

2 Claims. (Cl. 308—72)

This invention relates to self-aligning bearings, and has particular reference to a bearing structure in which a bushing is journaled in a stationary housing, and in which provision is made for introducing a lubricant to each relatively movable part of the bearing structure from a lubricating fitting mounted in the housing.

Structures of the type herein described are employed for mounting bearings on frame members which are likely to be misaligned or distorted during assembly, or which may become warped or sprung during use. The structure may be employed, for example, for providing journals for rotatable shafts of a control mechanism for straddle trucks of the type illustrated in my copending application, Serial No. 510,571, filed November 16, 1943, for Load hoist and grappling control, which matured into Patent 2,410,965, November 12, 1946. In the assembly of such vehicles, bearings may inadvertently be placed out of alignment, or the vehicle frame may be warped or sprung due to severe usage, to the extent that bearings are likely to be slightly off center. When this occurs, stresses are introduced or multiplied to such extent as to cause fatigue and ultimate fracture of the journaled member.

Lubrication of bearings of this type has heretofore been accomplished by making the bushings of a composition of finely divided metals, with or without an admixture of graphite. Such materials are compressed and heat treated to produce a firm porous structure, which may be saturated with lubricating oil. In other constructions the bushing is made in the form of a lubricant impregnated fibrous material inserted between the shaft and the housing and subjected to suitable pressure to compress the same to the desired shape.

Metal bushings have not heretofore been commonly in use in structures of this type, for the reason that adequate lubrication of such bushings has been difficult to achieve. In such structures both the socket for the bushing and the bore for reception of the shaft must receive a supply of lubricant, and it is for this reason that prior art structures of this type have comprised oil impregnated materials which accomplished lubrication of both the shaft and the bushing.

The instant invention comprises a housing adapted to be bolted or otherwise, as by welding, affixed to the frame or other part of the machine for providing a socket for a spherical bushing. The bushing is in the form of a frustum of a sphere having end faces formed on parallel planes, and is provided with an axial bore in which a shaft may be journaled. An oil groove is provided in the outer surface of the bushing in a plane midway between the end faces, a plurality of oil holes extending radially through the wall of the bushing and providing communication between the oil groove and the axial bore. A lubricating fitting is threaded into a tapped hole extending through the housing through which lubricant is introduced into the oil groove in the bushing. From thence the lubricant flows through the oil holes to the axial bore for lubricating the shaft.

It is, therefore, an object of the invention to provide a self-aligning bearing for shafts and the like having means providing for the flow of lubricant from a stationary lubricating fitting to the journaled member.

It is a further object of the invention to provide a self-aligning bearing structure in which the bushing may preferably be of bronze or other suitable material, and in which provision is made for repetitious lubrication of the bearing.

It is a further object of the invention to provide a new and improved construction for a self-aligning bearing, by means of which lubricants may be introduced through a stationary housing for lubricating a socket for a movable bushing, and from thence through the bushing for lubricating a shaft journaled therein.

These and other features of the invention are fully described in the following paragraphs, reference being made to the accompanying drawings, in which:

Figure 1 is an end elevation of a self-aligning bearing embodying the instant invention, showing a shaft journaled in the bushing, and illustrating a means for attaching the structure to a frame member; Figure 2 is a sectional view taken on the line 2—2 of Figure 1; Figure 3 is a side elevation of the structure, shown as taken from the right of Figure 1; Figure 4 is a perspective view of the bushing; and Figure 5 is a sectional view of the housing and bushing similar to that shown in Figure 2 and illustrating one step in the assembly of the structure.

Referring to the drawings, the structure illustrated comprises a housing 10 consisting of a base 11 shown as secured to a frame member 12 by means of hold-down bolts 13 fitted with nuts 14 and lock washers 15. Supported upon the base 11 is a block 16 shaped in the form of a frustum of a sphere having end faces formed on parallel planes and having an axial bore. The wall of said axial bore is longitudinally curved about a center coincident with the axis of said bore and constitutes at one end thereof a substantially concave or hemispherical socket 17. At the opposite end of said bore said housing is furcated to provide a plurality of annularly arranged, axially extending lugs 18 adapted to be pressed or bent inwardly over the periphery of a bushing seated in the socket 17 for retaining the same in position. As shown in the drawings, the lugs are tapered in thickness from the point of their connection to the body of the housing to their free ends. By this means the resistance to bending offered throughout the length of the lug is proportioned to the amount of curvature necessary to accomplish a substantially hemispherical seat at the end of the bore opposite the socket 17. At one side of the block 16 is provided a boss 19 having a hole 20 extending therethrough and being internally threaded adjacent its outer end for mounting therein a lubricating fitting 21 of conventional design.

The bushing 22 is in the form of a frustum of a sphere, also having end faces formed on parallell planes, and is provided with an axial bore 23 for the reception of a shaft 24. An oil groove 25 extends peripherally of the bushing midway between the planes of the end faces, a plurality of oil holes 26 extending radially through the wall of the bushing and providing communication between the oil groove 25 and the axial bore 23.

The several parts being constructed as hereinabove described, the bushing 22 is inserted endwise into the block 16, the spherically curved end of the bushing being seated in the hemispherical socket 17. Thereupon, the axially extending lugs 18 are bent or pressed inwardly into contact with the bushing for confining the bushing within the block 16. When thus assembled in operating position, the bushing may shift out of the plane normal to the axis of the block 16 so that the contained shaft may shift itself in any angular direction. It is intended, also, that the structure be so constructed that the bushing may creep in the direction of rotation of the shaft, so as to insure that wear occasioned by the thrust imposed by the shaft will be distributed equally over the periphery of the bushing.

With the parts in their assembled positions, the oil groove 25 is in alignment with the hole 20 through which the lubricant is fed from the lubricating fitting 21. The oil groove 25 is of sufficient width as to have direct communication with the hole 20 even though the bushing 22 be rotated so as to position the shaft 24 out of a plane normal to the axis of the housing 10. As the bushing is rotated in any such direction, the lubricant is spread between the wall of the block 16 and the surface of the bushing 22. This feature of the invention is especially desirable in constructions where relative movement between bearing structures supporting opposite ends of a shaft causes relative movement between the bushing and the housing.

A further advantage to be had in the provision of the oil groove 25 is that lubricant introduced into the oil groove may follow therearound and flow to the axial bore 23 through a plurality of the oil holes 26. Thus, in the event no one of the oil holes 26 is indirect alignment with the lubricating fitting 21, the lubricant introduced through the lubricating fitting 21 follows around the oil groove 25 until such time as it may find its way into the axial bore 23 through one or more of the oil holes 26.

An advantage of the construction herein described is that the bushing may be made from a suitable bronze or other suitable material, ample provision being made for supplying lubricant between each relatively movable part of the bearing structure as often as is required to maintain the bearing in working order.

Having now described my invention and in what manner the same may be used, what I claim as new and desire to protect by Letters Patent is:

1. A self-aligning bearing comprising a housing machined from a single homogeneous block of metal and having a longitudinally extending wall defining an axial bore, the walls of said bore being longitudinally curved about a center coincident with the axis of said bore, said housing at one end of said bore constituting a hemispherical socket having an integrally continuous peripheral surface, said housing at the opposite end of said bore being furcated and providing a plurality of annularly arranged axially extending lugs, a bushing seated in said socket, said lugs being pressed around the adjacent end of said bushing for retaining said bushing in said socket, a groove extending peripherally of said bushing, a radially extending hole in said bushing for providing communication between said groove and the member journaled in said bushing, the wall of said hemispherical socket extending longitudinally of said housing and forming a closure over the peripheral groove in said bushing, and means mounted in said housing for introducing lubricant into said groove.

2. A self-aligning bearing comprising an integral one-piece housing member, a hemispherical socket formed in one end of said housing member having an integrally continuous peripheral surface, said housing being furcated at the other end around the rim of said socket to provide a plurality of annularly arranged axially extending lugs, a spherical bushing member seated in said socket for universal movement and rotation therein, said lugs being pressed around the adjacent end of said bushing member for retaining the same in said socket, a shaft bearing surface in said bushing member, an annular lubricating groove in one of said members disposed longitudinally of said bearing between the continuous peripheral surface end of said socket and the rim of said socket, said annular groove being in continuous contact with the mating surface of the other of said members, radial passages in said bushing member communicatively connecting said groove to said shaft bearing surface, and an opening in the wall of the socket portion of said housing member communicating with said groove to admit lubricant to lubricate said bushing in said socket and to lubricate a shaft in said bushing.

HENRY N. DIMICK.

REFERENCES CITED

The following references are of record in the file of this patent:

UNITED STATES PATENTS

| Number | Name | Date |
|---|---|---|
| 609,778 | Capewell | Aug. 30, 1898 |
| 1,664,189 | Claus | Mar. 27, 1928 |
| 1,684,984 | Claus | Sept. 28, 1928 |
| 1,693,748 | Fiegel | Dec. 4, 1928 |
| 1,778,391 | Kendall | Oct. 14, 1930 |
| 1,924,072 | Lavigne | Aug. 22, 1933 |
| 2,061,758 | Eastman | Nov. 24, 1936 |

FOREIGN PATENTS

| Number | Country | Date |
|---|---|---|
| 288,011 | Italy | Aug. 22, 1931 |